A. T. BRITTON.
TILLING MACHINE.
APPLICATION FILED MAY 9, 1916.

1,233,442.

Patented July 17, 1917.
2 SHEETS—SHEET 2.

WITNESSES:
Robt. D. Pearson.
C. E. Lodge.

INVENTOR
Arthur T. Britton
BY
F. C. Bates
ATTORNEY.

UNITED STATES PATENT OFFICE.

ARTHUR T. BRITTON, OF SAN JOSE, CALIFORNIA.

TILLING-MACHINE.

1,233,442.   Specification of Letters Patent.   Patented July 17, 1917.

Application filed May 9, 1916. Serial No. 96,359.

*To all whom it may concern:*

Be it known that I, ARTHUR T. BRITTON, a citizen of the United States, and a resident of San Jose, in the county of Santa Clara and State of California, have invented a certain new and useful Improvement in Tilling-Machines, of which the following is a specification.

My invention relates to improvement in a machine for tilling the soil, and the objects of my invention are:

First, to provide a tilling machine that can be operated and drawn by a traction engine.

Second, to provide a tilling machine for tilling the soil, that will till the soil in two layers, placing the lower stratum over the surface stratum, and thereby covering all weeds and other debris under the lower stratum of the soil.

Third, to provide a tilling machine that will leave the surface of the ground well broken up and smooth, thereby avoiding the use of a harrow for smoothing the surface of the ground, as is now in use after plowing.

A still further object of my invention is generally to improve this class of tilling machines for tilling the soil, so as to increase their utility, durability and efficiency.

Further objects and advantages will appear in the following description, it being understood that various changes in form, proportions and minor details of construction may be resorted to within the scope of the appended claims.

Figure 1:
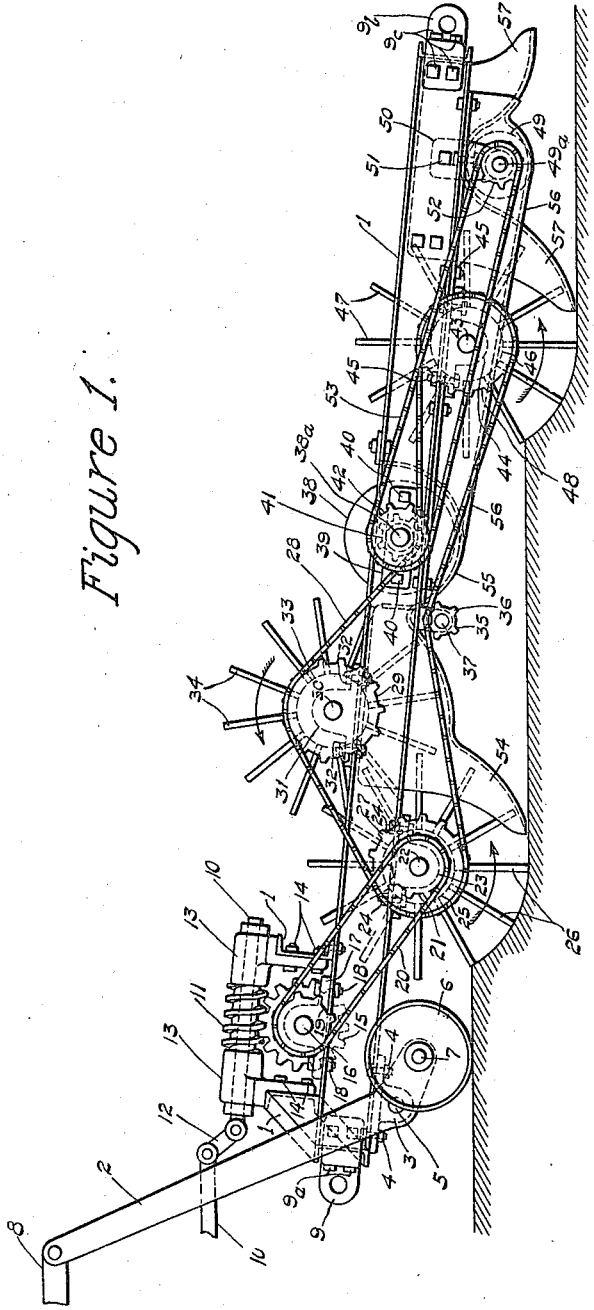

For a full understanding of the invention and the merits thereof, reference is to be had to the following description and accompanying drawings, in which, Figure 1 is a side elevation of my tilling machine showing the general construction thereof, parts broken away.

Figure 2:
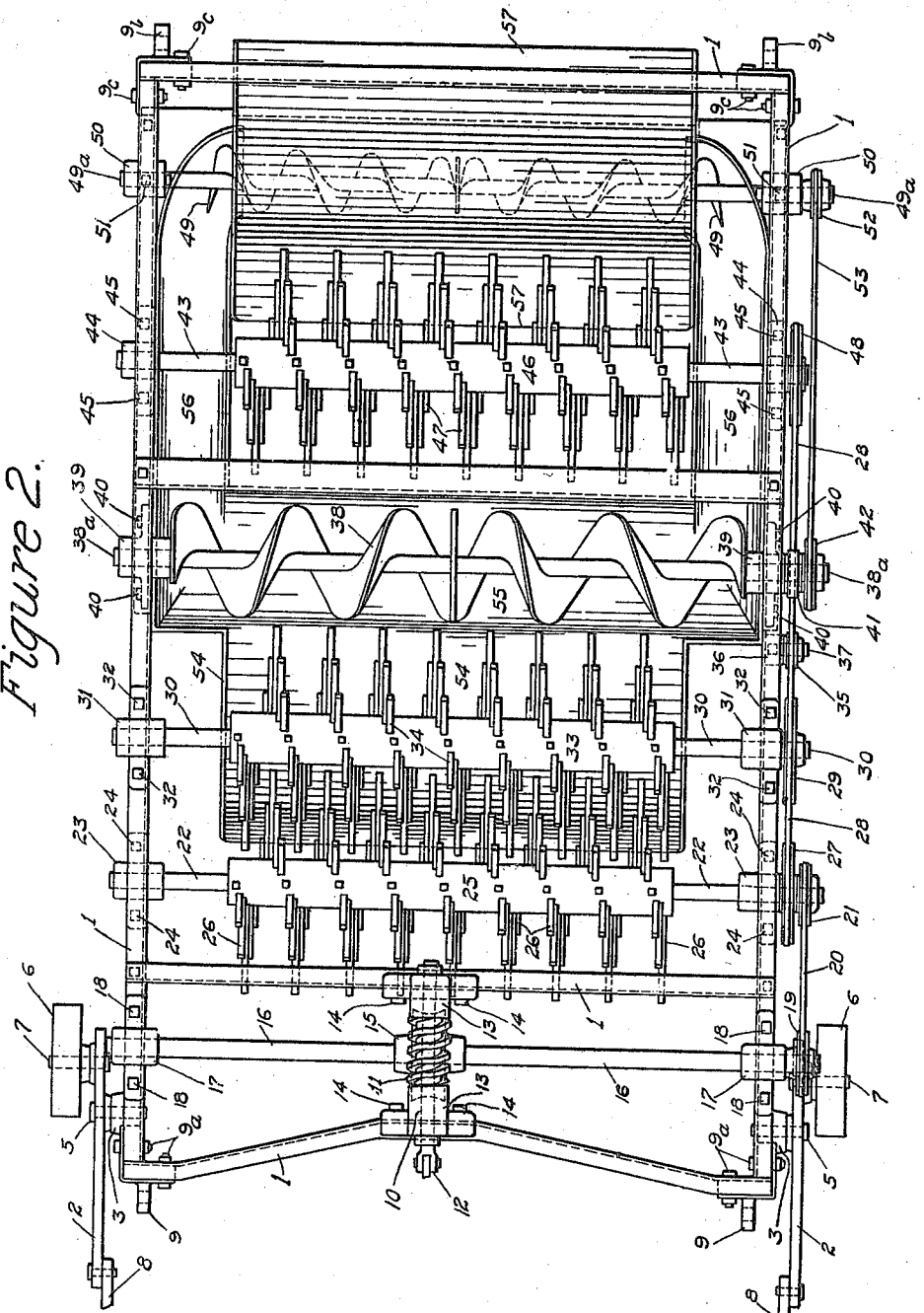

Fig. 2 is a plan view of my tilling machine showing general arrangements of parts.

Corresponding and like parts are referred to in the following description and indicated in all the views of the drawings by the same reference characters.

Referring now more particularly to the drawings, 1 is the main frame of my tilling machine to which is attached wheel crank levers 2, by bearings 3, said bearings being held in place on frame 1 by bolts 4, connected to said crank levers 2 are fulcrum pins 5, on the lower end of said crank levers 2 wheels 6 are mounted on axle pins 7. Said crank levers 2 are for the purpose of adjusting the depth of surface soil to be tilled, and for elevating the machine above the surface soil when so required, connecting rods are shown at 8 adapted to operate said crank levers 2 and said wheels 6 by the operator from a traction engine, said tilling machine being drawn by draw-bar connection 9 fastened to frame 1 by bolts 9$^a$, a draw bar connection 9$^b$ is shown at the rear end of frame 1 fastened to frame 1 by bolts 9$^c$. Said tilling machine is operated by power shaft 10 connecting with a traction engine not shown, said power shaft 10 connecting with worm drive 11 by universal joint 12, said worm drive 11 being held in place on frame 1 by bearings 13 and bolts 14, said worm drive meshing with worm gear 15, said worm gear being positioned on shaft 16, said shaft 16 being held in place on frame 1 by bearings 17, said bearings being bolted to frame 1 by bolts 18. On one end of said shaft 16 is fastened sprocket wheel 19, to which is connected sprocket chain 20, leading to sprocket wheel 21, said sprocket wheel 21 being fastened to shaft 22, said shaft 22 being held in place on the underside of frame 1 by bearings 23 and bolts 24. Fastened to said shaft 22 is toothed drum 25, in which is positioned a plurality of steel teeth 26, adapted to till the surface soil and be replaced from breakage or wear. On the driven end of said shaft 22 is fastened sprocket wheel 27, connecting with sprocket wheel 27 is sprocket chain 28 leading to sprocket wheel 29 fastened to the driven end of shaft 30, said shaft 30 being held in place on top of frame 1 by bearings 31, and bolts 32. Fastened to said shaft 30 is toothed drum 33 in which is positioned a plurality of steel teeth 34, meshing with teeth 26 in drum 25, the same being adapted to clean the weeds and grass from said steel teeth 26, said teeth being adapted to be replaced after breakage or wear, said sprocket chain 28 passing over sprocket wheel 35, said sprocket wheel 35 being held in place by bracket 36, and axle pin 37, said bracket 36 being fastened to the under side of frame 1 in any suitable manner. This sprocket wheel 35 is for the purpose of taking up the slack of sprocket chain 28.

A right and left screw soil conveyer is shown at 38, held in place through frame 1 by bearings 39 and bolts 40. Fastened to the outer end of said screw soil conveyer-shaft 38ª, is sprocket wheel 41, and sprocket wheel 42, sprocket chain 28 meshing with sprocket wheel 41. Shaft 43 is shown connected to the under side of frame 1 by bearings 44, and held in place by bolts 45, fastened to said shaft 43 is toothed drum 46 in which is positioned a plurality of steel teeth 47, the same being adapted to till the lower stratum of the soil and are interchangeable in said drum 46 after breakage or wear. On the driven end of said shaft 43 is fastened sprocket wheel 48, sprocket chain 28 meshing therewith. A right and left screw conveyer is shown at 49 adapted to receive and spread the surface soil delivered thereto through side troughs 56, and is held in place on the under side of frame 1 by bearings 50 and bolts 51. Fastened to the outer end of said screw conveyer shaft 49ª is sprocket wheel 52, driven by sprocket chain 53, said sprocket chain 53 meshing with sprocket wheel 42, and thereby driving said conveyer 49. Soil scoop 54 is fastened to frame 1 in any suitable manner and is adapted to deliver the surface stratum of the soil to conveyer 38, said conveyer 38 operating in trough 55 conveys the soil each way from the center through trough 55 to side troughs 56, thence to conveyer 49 which spreads the surface soil beneath the rear scoop 57. Said rear scoop 57 is fastened to frame 1 in any suitable manner and is adapted to deliver the lower stratum of the soil taken up by steel teeth 47 over the surface stratum spread by conveyer 49, the rear end of said scoop 57 is adapted to smooth the lower stratum of the soil on top of the surface stratum of the soil, leaving the soil smooth and level, and well broken up.

The operation of my tilling machine is as follows; connection is made to a tractor by draw-bar connection 9, and power shaft 10 which operates worm drive 11 through universal joint 12, the same operating worm gear 15, and shaft 16, and sprocket wheel 19, to which is attached sprocket chain 20 driving sprocket wheel 21 and shaft 22, and toothed drum 25 carrying a plurality of steel teeth 26, said steel teeth revolving as the arrow points against the surface soil, the depth of which being governed by wheel crank lever 2. Steel teeth 26 carry the surface soil upward and into scoop 54, thence to conveyer 38, operating in trough 55 which conveys the surface soil each way from the center to side troughs 56 thence to conveyer 49, which spreads the surface soil beneath the rear scoop 57. The lower stratum is taken up by steel teeth 47 fastened to drum 46 and carried up through scoop 57 which delivers the lower stratum of soil over the surface stratum of the soil, leaving the same well broken up and smooth.

A plurality of steel teeth 34 fastened to drum 33 and shaft 30 and meshing with steel teeth 26 and revolving as the arrow points is for the purpose of removing the grass and weeds from steel teeth 26. To remove the tilling machine from the ground of operation, connection is made to a tractor by draw bar 9ᵇ at the rear end of said machine, this raises the working parts of the rear end of the machine up clear of the ground, the front end of said tilling machine being raised clear of the ground by wheels 6 and crank lever 2.

Having thus described my invention, what I claim as new and desire to secure by Letters Patent, is:

1. In a tilling machine, of the class described, a main frame, a power shaft, connected to said main frame, a universal joint connected to said power shaft, a worm drive; said worm drive being fastened to said power shaft, a worm gear, a worm gear shaft, to which said worm gear is fastened; said worm drive meshing with said worm gear, a sprocket wheel fastened to the outer end of said worm gear shaft, a second shaft, a tooth drum fastened to said second shaft, a plurality of steel teeth positioned in said drum, adapted to till the surface soil, a third shaft, a drum fastened to said shaft, a plurality of steel teeth positioned in said drum, adapted to mesh with the first mentioned steel teeth for the purpose of cleaning the weeds and grass therefrom, a fourth shaft, a fifth shaft, a sixth shaft, power transmitting means for all the shafts actuated from said sprocket wheel, and earth working elements operated by said shafts, substantially as shown and described.

2. In a tilling machine, of the class described, a main frame, a power shaft, a universal joint connected between said power shaft, and a worm drive which is connected to said frame, a worm gear meshing with said worm drive, a shaft to which said worm gear is fastened, a second shaft, chain and sprocket gear connecting said shafts, said second shaft having a drum fastened thereto, a plurality of steel teeth positioned in said drum, adapted to till the surface soil, a right and left screw conveyer, a soil scoop and means for fastening the same to said main frame, said soil scoop being adapted to deliver the surface stratum of the soil to said right and left screw conveyer, a trough in which said screw conveyer operates, side troughs through which the surface soil is conveyed from said first mentioned trough, a sprocket wheel fastened to the outer end of said conveyer shaft, adapted to drive said conveyer, a sprocket chain and means for taking up the slack of said sprocket chain, a second sprocket wheel fastened to said conveyer shaft, a sprocket chain connecting therewith, a shaft connected to the under side of said frame, a toothed drum fastened to said shaft, a plurality of steel teeth fastened thereto, adapted to till the lower stratum of the soil, a sprocket wheel fastened to said shaft, a sprocket chain by which said shaft and said drum are driven, substantially as shown and described.

3. In a tilling machine, of the class described, a main frame, a power shaft, a universal joint connected to said power shaft, a worm drive, and means by which said worm drive is fastened to said frame and connected to said universal joint, a worm gear meshing with said worm drive, a shaft to which said worm gear is fastened, adapted to connect with a second shaft, and drive said second shaft, a third shaft, adapted to be driven from said second shaft, a fourth shaft, adapted to be driven from said second shaft, a fifth shaft, adapted to be driven from said second shaft, a sixth shaft, adapted to be driven by said fourth shaft and earth working elements operated by said shafts, substantially as shown and described.

4. In a tilling machine the combination of a main frame, a power shaft attached thereto, a universal joint attached to said power shaft, and serving as connection with a source of power, a worm drive fastened to said power shaft, a shaft positioned on said main frame, a worm driven gear fastened to said shaft operatively connected to the working parts of said machine, soil digging and elevating means on said frame, a right and left screw conveyer positioned on the under side of said main frame, adapted to receive and spread the surface soil delivered thereto by said soil elevating means; a shaft positioned on the under side of said main frame, a tooth drum fastened to said shaft, a plurality of steel teeth positioned in said drum, adapted to till the lower stratum of the soil; a rear scoop fastened to said main frame, adapted to deliver the lower stratum of the soil tilled on top of the surface stratum of the soil, and smooth the same, substantially as shown and described.

In testimony whereof I have hereunto affixed my signature in presence of two subscribing witnesses.

ARTHUR T. BRITTON.

Witnesses:
C. M. BARNES,
C. E. LODGE.

Copies of this patent may be obtained for five cents each, by addressing the "Commissioner of Patents, Washington, D. C."